United States Patent
Coimbatore Krishnamurthy et al.

(10) Patent No.: US 12,493,552 B1
(45) Date of Patent: Dec. 9, 2025

(54) PERFORMING SNOOP FILTER REPLACEMENT BASED ON HISTORY-AUGMENTED VICTIMIZATION PRIORITY VALUES OF SNOOP FILTER ENTRIES IN PROCESSOR-BASED DEVICES

(71) Applicant: Ampere Computing LLC, Santa Clara, CA (US)

(72) Inventors: Bharadwaj Coimbatore Krishnamurthy, Hillsboro, OR (US); Richard James Shannon, Portland, OR (US); Allan McBride Rudwick, Portland, OR (US); Benjamin Crawford Chaffin, Portland, OR (US)

(73) Assignee: Ampere Computing LLC, Santa Clara, CA (US)

( * ) Notice: Subject to any disclaimer, the term of this patent is extended or adjusted under 35 U.S.C. 154(b) by 0 days.

(21) Appl. No.: 18/767,757

(22) Filed: Jul. 9, 2024

(51) Int. Cl.
*G06F 12/0831* (2016.01)
*G06F 12/0811* (2016.01)
*G06F 12/123* (2016.01)

(52) U.S. Cl.
CPC ...... *G06F 12/0831* (2013.01); *G06F 12/0811* (2013.01); *G06F 12/123* (2013.01)

(58) Field of Classification Search
CPC . G06F 12/0811; G06F 12/0831; G06F 12/123
See application file for complete search history.

(56) References Cited

U.S. PATENT DOCUMENTS

| 6,598,123 B1* | 7/2003 | Anderson | G06F 12/0833 711/146 |
| 2018/0276140 A1* | 9/2018 | Quinnell | G06F 12/0862 |
| 2022/0308999 A1* | 9/2022 | Randall | G06F 12/0831 |

OTHER PUBLICATIONS

Jain, A. et al., "Cache Replacement Policies," Morgan & Claypool Publishers, Jun. 2019, 83 pages.
Jaleel, A. et al., "High Performance Cache Replacement Using Re-Reference Interval Prediction (RRIP)," Proceedings of the 37th Annual International Symposium on Computer Architecture (ISCA '10), Jun. 19-23, 2010, Sain-Malo, France, ACM, 13 pages.

* cited by examiner

Primary Examiner — Aracelis Ruiz
(74) Attorney, Agent, or Firm — Withrow & Terranova, PLLC

(57) ABSTRACT

Aspects disclosed in the detailed description include performing snoop filter replacement based on history-augmented victimization priority values of snoop filter entries in processor-based devices. In an exemplary aspect, a Fully Coherent Home Node (HN-F) circuit of a processor-based device receives, from a Fully Coherent Request Node (RN-F) circuit, a transaction request comprising a memory address. The HN-F circuit determines a victimization priority value based on the transaction request. Upon determining that no snoop filter entry in a snoop filter of the HN-F circuit stores the memory address and determining that no snoop filter entries are available for allocation, the HN-F circuit selects a target snoop filter entry that stores a highest victimization priority value among the snoop filter entries, writes the current memory address of the target snoop filter back to memory, and then stores the memory address and the victimization priority value in the target snoop filter entry.

30 Claims, 10 Drawing Sheets

TABLE 200 OF EXEMPLARY VICTIMIZATION PRIORITY LEVELS

| | |
|---|---|
| 202(0) | L3 LRU; ONLY ONE (1) COPY |
| 202(1) | L3 MRU; ONLY ONE (1) COPY |
| 202(2) | L2 LRU; ONLY ONE (1) COPY |
| 202(3) | L2 AGING$_1$; ONLY ONE (1) COPY |
| 202(4) | L2 AGING$_0$; ONLY ONE (1) COPY |
| 202(5) | L2 MRU; ONLY ONE (1) COPY |
| 202(6) | MORE THAN ONE COPY |

DECREASING VICTIMIZATION PRIORITY →

FIG. 2

PERFORMING SNOOP FILTER REPLACEMENT BASED ON HISTORY-AUGMENTED VICTIMIZATION PRIORITY VALUES OF SNOOP FILTER ENTRIES IN PROCESSOR-BASED DEVICES

TECHNICAL FIELD

The technology of the disclosure relates generally to coherent interconnects in processor-based devices, and, in particular, to managing snoop filters in coherent interconnects.

BACKGROUND

The Coherent Hub Interface (CHI) is a specification that is part of the fifth generation of the ARM Advanced Microcontroller Bus Architecture (AMBA). CHI defines interfaces through which high-performance non-blocking interconnects enable communications between fully coherent processor devices and memory controllers. CHI enables complex interconnect topologies and high scalability by facilitating communication between the processor devices and memory controllers in a way that maintains cache coherency, while ensuring that the interconnect never becomes the bottleneck in the system. In this manner, multiple processor devices can access the same memory resources and receive consistent updates, thereby avoiding issues where one processor device has outdated information.

Interconnect topologies implemented according to CHI may include components known as Fully Coherent Home Node (HN-F) circuits and Fully Coherent Request Node (RN-F) circuits. RN-F circuits may comprise, e.g., processor devices or processor cores of a processor-based device that contain coherent caches. RN-F circuits generate transaction requests that are sent to an HN-F circuit, and accept and respond to snoops. HN-F circuits may be provided as part of a CHI interconnect within the processor-based device, and are responsible for ordering transaction requests to coherent memory and generating transactions to memory controllers. HN-F circuits may also issue snoops to RN-F circuits.

Each HN-F circuit is conventionally implemented with a snoop filter that may improve efficiency by reducing unnecessary traffic on the CHI interconnect. The snoop filter contains snoop filter entries that together make up a directory of cache lines that are cached by the RN-F circuits in the processor-based device. The snoop filter is used by the HN-F circuit to send snoops only to either a particular RN-F circuit, or only to a subset of the RN-F circuits. This reduces the total number of snoops sent via the CHI interconnect, thereby improving performance by reducing latency and traffic bandwidth.

If the snoop filter of an HN-F circuit is implemented as an associative array (as opposed to a direct-mapped array), it is necessary for the HN-F circuit to implement a policy for selecting a snoop filter entry to "victimize," or reallocate, when the need arises to add a new cache line to an already full snoop filter way. However, because cache hits on Level 2 (L2) or Level 3 (3) caches of the RN-F circuits of a processor-based device may be invisible to the HN-F circuit, the implementation of a high-performance victimization algorithm for the snoop filter of the HN-F circuit may prove challenging.

SUMMARY OF THE DISCLOSURE

Aspects disclosed in the detailed description include performing snoop filter replacement based on history-augmented victimization priority values of snoop filter entries in a processor-based devices. Related methods and computer-readable media are also disclosed. In this regard, a processor-based device provides an interconnect comprising a Fully Coherent Home Node (HN-F) circuit that includes a snoop filter, and that is communicatively connected to a plurality of Fully Coherent Request Node (RN-F) circuits. The RN-F circuits may comprise processor devices, processor cores, and/or other hardware elements of the processor device that are configured to access a shared memory device via the interconnect.

The HN-F circuit is configured to receive a transaction request comprising a memory address from an RN-F circuit of the plurality of RN-F circuits. The HN-F circuit determines a victimization priority value based on the transaction request, where the victimization priority value represents a relative preference for "victimization" (i.e., reallocation of a snoop filter entry storing the memory address in the snoop filter) based on, e.g., recency of reuse, the cache level at which a cache line corresponding to the memory address is stored by an RN-F circuit, a number of copies of the cache line, and a past history of victim selection, as non-limiting examples.

The HN-F circuit next determines whether any snoop filter entry among a plurality of snoop filter entries of the snoop filter of the HN-F circuit stores the memory address of the transaction request. If not, the HN-F circuit further determines whether the snoop filter has a snoop filter entry available for allocation. If no snoop filter entries are available for allocation, the HN-F circuit selects a target snoop filter entry that stores a highest victimization priority value among the plurality of snoop filter entries. The HN-F circuit then "victimizes" the target snoop filter entry by evicting the target snoop filter entry and any copies of cache lines corresponding to the memory address of the target snoop filter within the processor-based device, and writing the evicted cache line back to memory if it contains data that has been modified. The target snoop filter entry is then reallocated, and used to store the memory address of the transaction request, along with its corresponding victimization priority value, in the target snoop filter entry. In this manner, the HN-F circuit maximizes interconnect performance by optimizing the selection of snoop filter entries to victimize.

In some aspects, if the HN-F circuit determines that a snoop filter entry in the snoop filter already stores the memory address, the HN-F circuit updates the snoop filter entry that stores the memory address with the victimization priority value. If the HN-F circuit determines that no snoop filter entry stores the memory address but an available snoop filter entry exists within the snoop filter, the HN-F circuit stores the memory address and the corresponding victimization priority value in the available snoop filter entry. Some aspects may further provide that, after storing the memory address of the transaction request and the corresponding victimization priority value in a snoop filter entry of the snoop filter, the HN-F circuit updates victimization priority values of other snoop filter entries to apply an aging modification to their victimization priority values. The aging modification according to some aspects may comprise increasing the victimization priority values of existing snoop filter entries.

The HN-F circuit in some aspects may further comprise a victim history buffer (VHB) that comprises a plurality of VHB entries. When the HN-F circuit in such aspects victimizes a target snoop filter entry in the snoop filter, the HN-F circuit allocates a VHB entry for the target snoop filter entry, and stores the memory address of the target snoop filter entry in the VHB entry. Subsequently, when determining a victim prioritization value for a memory address for a later transaction request, the HN-F circuit determines whether the memory address is stored in a VHB entry of the plurality of VHB entries. If so, the HN-F circuit determines the victimization priority value as corresponding to a VHB-hit victimization priority level that is lower than a corresponding VHB-miss victimization priority level, and deallocates the VHB entry. However, if the HN-F circuit determines that the memory address is not stored among the plurality of VHB entries, the HN-F circuit determines the victimization priority value as corresponding to the VHB-miss victimization priority level.

Some aspects may provide that the HN-F circuit is configured to determine the victimization priority value for the memory address of the transaction request by determining whether a copy of a cache line corresponding to a memory address of a transaction request of the transaction request is stored in more than one (1) of the plurality of RN-F circuits. If so, the HN-F circuit in such aspects determines the victimization priority value as corresponding to a More than One Copy victimization priority level that is a lowest victimization priority level. According to some aspects, the HN-F circuit may determine the victimization priority value for the memory address of the transaction request by determining whether the memory address corresponds to a cache line moved from a Level 3 (L3) cache to a Level 2 (L2) cache. In that case, the HN-F circuit may determine the victimization priority value as corresponding to an L2 victimization priority level that is lower than an L3 victimization priority level.

In some aspects, the HN-F circuit is configured to determine the victimization priority value for the memory address of the transaction request by determining whether the memory address is stored in an L2 cache and a request type of the transaction request is one of AllocatingRead and MakeUnique. If so, the HN-F circuit determines the victimization priority value as corresponding to a lowest L2 victimization priority level. Some aspects may provide that the HN-F circuit is configured to determine the victimization priority value for the memory address of the transaction request by determining whether the transaction request is an L3 stash request having a request type of one of WriteEvictFull, WriteEvictorEvict, WriteBackFull, and Atomic. In that case, the HN-F circuit in such aspects determines the victimization priority value as corresponding to a lowest L3 victimization priority level. The HN-F circuit in some aspect may determine the victimization priority value for the memory address of the transaction request by determining whether the memory address is stored in an L3 cache and the transaction request is an L3 Copy Invalidate by snooping having a request type of one of AllocatingRead, MakeUnique, and CleanUnique. If so, the HN-F circuit determines the victimization priority value as corresponding to a lowest L2 victimization priority level.

In another exemplary aspect, an HN-F circuit is provided. The HN-F circuit comprises a snoop filter that stores a plurality of snoop filter entries, each of which is configured to store a memory address and a victimization priority value for the memory address. The HN-F circuit is configured to receive, from a first RN-F circuit of a plurality of RN-F circuits communicatively coupled to the HN-F circuit, a first transaction request comprising a first memory address. The HN-F circuit is further configured to determine a first victimization priority value based on the first transaction request. The HN-F circuit is also configured to determine that no snoop filter entry among the plurality of snoop filter entries stores the first memory address. The HN-F circuit is additionally configured to determine that the snoop filter has no snoop filter entries available for allocation. The HN-F circuit is further configured to select a target snoop filter entry that stores a highest victimization priority value among the plurality of snoop filter entries. The HN-F circuit is also configured to store the first memory address in the target snoop filter entry. The HN-F circuit is additionally configured to store the first victimization priority value in the target snoop filter entry.

In another exemplary aspect, a processor-based device is provided. The processor-based device comprises means for receiving, from an RN-F circuit of a plurality of RN-F circuits, a transaction request comprising a memory address. The processor-based device further comprises means for determining a victimization priority value based on the transaction request. The processor-based device also comprises means for determining that no snoop filter entry among a plurality of snoop filter entries of a snoop filter stores the memory address. The processor-based device additionally comprises means for determining that the snoop filter has no snoop filter entries available for allocation. The processor-based device further comprises means for selecting a target snoop filter entry that stores a highest victimization priority value among the plurality of snoop filter entries. The processor-based device also comprises means for storing the memory address in the target snoop filter entry. The processor-based device additionally comprises means for storing the victimization priority value in the target snoop filter entry.

In yet another exemplary aspect, a method of performing snoop filter replacement based on history-augmented victimization priority values of snoop filter entries in a processor-based device is provided. The method comprises receiving, by an HN-F circuit from a first RN-F circuit of a plurality of RN-F circuits communicatively coupled to the HN-F circuit, a first transaction request comprising a first memory address. The method further comprises determining, by the HN-F circuit, a first victimization priority value based on the first transaction request. The method also comprises determining, by the HN-F circuit, that no snoop filter entry among a plurality of snoop filter entries of a snoop filter of the HN-F circuit stores the first memory address. The method additionally comprises determining, by the HN-F circuit, that the snoop filter has no snoop filter entries available for allocation. The method further comprises selecting, by the HN-F circuit, a target snoop filter entry that stores a highest victimization priority value among the plurality of snoop filter entries. The method also comprises storing, by the HN-F circuit, the first memory address in the target snoop filter entry. The method additionally comprises storing, by the HN-F circuit, the first victimization priority value in the target snoop filter entry.

In yet another exemplary aspect, a non-transitory computer-readable medium stores thereon computer-executable instructions that, when executed by a processor device, cause the processor device to receive, from an RN-F circuit of a plurality of RN-F circuits, a transaction request comprising a memory address. The computer-executable instructions further cause the processor device to determine a victimization priority value based on the transaction request. The computer-executable instructions also cause the processor device to determine that no snoop filter entry among a plurality of snoop filter entries of a snoop filter stores the memory address. The computer-executable instructions additionally cause the processor device to determine that the snoop filter has no snoop filter entries available for allocation. The computer-executable instructions further cause the processor device to select a target snoop filter entry that stores a highest victimization priority value among the plurality of snoop filter entries. The computer-executable instructions also cause the processor device to store the memory address in the target snoop filter entry. The computer-executable instructions additionally cause the processor device to store the victimization priority value in the target snoop filter entry.

BRIEF DESCRIPTION OF THE FIGURES

FIG. 2 illustrates exemplary victimization priority levels that may correspond to the victimization priority values of FIG. 1, according to some aspects;

DETAILED DESCRIPTION

Figure 1:
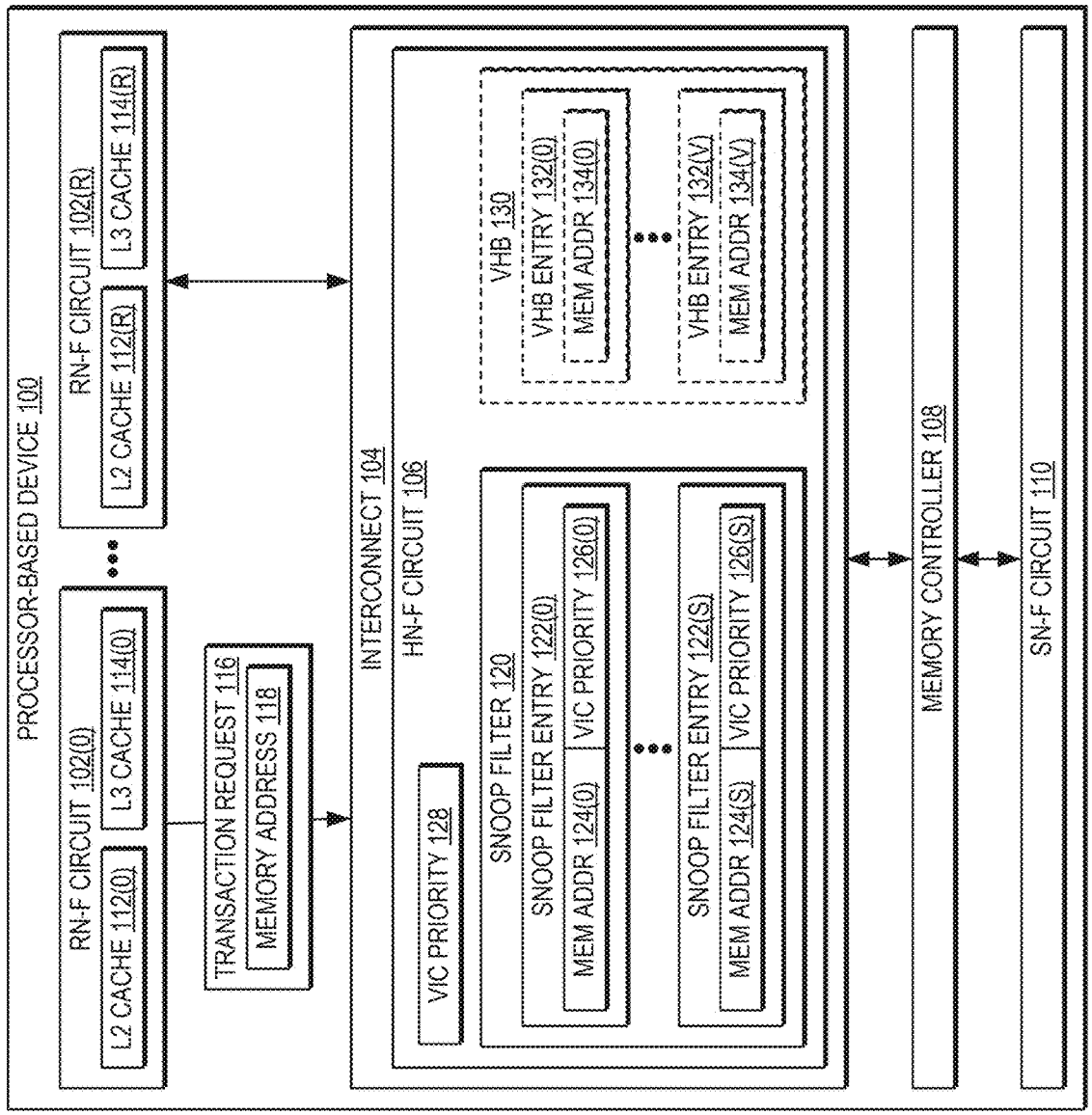
FIG. 1 is a block diagram of an exemplary processor-based device including an interconnect that comprises a Fully Coherent Home Node (HN-F) circuit for performing snoop filter replacement based on history-augmented victimization priority values of snoop filter entries, according to some aspects.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include performing snoop filter replacement based on history-augmented victimization priority values of snoop filter entries in a processor-based devices. Related methods and computer-readable media are also disclosed. In this regard, a processor-based device provides an interconnect comprising a Fully Coherent Home Node (HN-F) circuit that includes a snoop filter, and that is communicatively connected to a plurality of Fully Coherent Request Node (RN-F) circuits. The RN-F circuits may comprise processor devices, processor cores, and/or other hardware elements of the processor device that are configured to access a shared memory device via the interconnect.

The HN-F circuit is configured to receive a transaction request comprising a memory address from an RN-F circuit of the plurality of RN-F circuits. The HN-F circuit determines a victimization priority value based on the transaction request, where the victimization priority value represents a relative preference for "victimization" (i.e., reallocation of a snoop filter entry storing the memory address in the snoop filter) based on, e.g., recency of reuse, the cache level at which a cache line corresponding to the memory address is stored by an RN-F circuit, a number of copies of the cache line, and a past history of victim selection, as non-limiting examples.

The HN-F circuit next determines whether any snoop filter entry among a plurality of snoop filter entries of the snoop filter of the HN-F circuit stores the memory address of the transaction request. If not, the HN-F circuit further determines whether the snoop filter has a snoop filter entry available for allocation. If no snoop filter entries are available for allocation, the HN-F circuit selects a target snoop filter entry that stores a highest victimization priority value among the plurality of snoop filter entries. The HN-F circuit then "victimizes" the target snoop filter entry by evicting the target snoop filter entry and any copies of cache lines corresponding to the memory address of the target snoop filter within the processor-based device, and writing the evicted cache line back to memory if it contains data that has been modified. The target snoop filter entry is then reallocated, and used to store the memory address of the transaction request, along with its corresponding victimization priority value, in the target snoop filter entry. In this manner, the HN-F circuit maximizes interconnect performance by optimizing the selection of snoop filter entries to victimize.

In some aspects, if the HN-F circuit determines that a snoop filter entry in the snoop filter already stores the memory address, the HN-F circuit updates the snoop filter entry that stores the memory address with the victimization priority value. If the HN-F circuit determines that no snoop filter entry stores the memory address but an available snoop filter entry exists within the snoop filter, the HN-F circuit stores the memory address and the corresponding victimization priority value in the available snoop filter entry. Some aspects may further provide that, after storing the memory address of the transaction request and the corresponding victimization priority value in a snoop filter entry of the snoop filter, the HN-F circuit updates victimization priority values of other snoop filter entries to apply an aging modification to their victimization priority values. The aging modification according to some aspects may comprise increasing the victimization priority values of existing snoop filter entries.

The HN-F circuit in some aspects may further comprise a victim history buffer (VHB) that comprises a plurality of VHB entries. When the HN-F circuit in such aspects victimizes a target snoop filter entry in the snoop filter, the HN-F circuit allocates a VHB entry for the target snoop filter entry, and stores the memory address of the target snoop filter entry in the VHB entry. Subsequently, when determining a victim prioritization value for a memory address for a later transaction request, the HN-F circuit determines whether the memory address is stored in a VHB entry of the plurality of VHB entries. If so, the HN-F circuit determines the victimization priority value as corresponding to a VHB-hit victimization priority level that is lower than a corresponding VHB-miss victimization priority level, and deallocates the VHB entry. However, if the HN-F circuit determines that the memory address is not stored among the plurality of VHB entries, the HN-F circuit determines the victimization priority value as corresponding to the VHB-miss victimization priority level.

Some aspects may provide that the HN-F circuit is configured to determine the victimization priority value for the memory address of the transaction request by determining whether a copy of a cache line corresponding to a memory address of a transaction request of the transaction request is stored in more than one (1) of the plurality of RN-F circuits. If so, the HN-F circuit in such aspects determines the victimization priority value as corresponding to a More than One Copy victimization priority level that is a lowest victimization priority level. According to some aspects, the HN-F circuit may determine the victimization priority value for the memory address of the transaction request by determining whether the memory address corresponds to a cache line moved from a Level 3 (L3) cache to a Level 2 (L2) cache. In that case, the HN-F circuit may determine the victimization priority value as corresponding to an L2 victimization priority level that is lower than an L3 victimization priority level.

In some aspects, the HN-F circuit is configured to determine the victimization priority value for the memory address of the transaction request by determining whether the memory address is stored in an L2 cache and a request type of the transaction request is one of AllocatingRead and MakeUnique. If so, the HN-F circuit determines the victimization priority value as corresponding to a lowest L2 victimization priority level. Some aspects may provide that the HN-F circuit is configured to determine the victimization priority value for the memory address of the transaction request by determining whether the transaction request is an L3 stash request having a request type of one of WriteEvictFull, WriteEvictorEvict, WriteBackFull, and Atomic. In that case, the HN-F circuit in such aspects determines the victimization priority value as corresponding to a lowest L3 victimization priority level. The HN-F circuit in some aspect may determine the victimization priority value for the memory address of the transaction request by determining whether the memory address is stored in an L3 cache and the transaction request is an L3 Copy Invalidate by snooping having a request type of one of AllocatingRead, MakeUnique, and CleanUnique. If so, the HN-F circuit determines the victimization priority value as corresponding to a lowest L2 victimization priority level.

In this regard, FIG. 1 is a block diagram of a processor-based device 100 that comprises a plurality of RN-F circuits 102(0)-102(R) that are communicatively coupled to an interconnect 104 comprising an HN-F circuit 106. The interconnect 104 may comprise, e.g., an ARM Advanced Microcontroller Bus Architecture, fifth generation (AMBA5) Coherent Hub Interface (CHI) interconnect. Each of the RN-F circuits 102(0)-102(R) may comprise, e.g., processor devices, processor cores, and/or other hardware elements of the processor-based device 100. For example, the RN-F circuits 102(0)-102(R) may be in-order or out-of-order processors (OoPs) or processor cores, and may be implemented on one (1) System-on-Chip (SoC) or distributed across multiple SoCs. The RN-F circuits 102(0)-102(R) are also communicatively coupled via the interconnect 104 to a memory controller 108. The memory controller 108 is configured to perform memory read and write operations on a Fully Coherent Subordinate Node (SN-F) circuit (captioned as "SN-F CIRCUIT" in FIG. 1) 110, which in some aspects may comprise a memory device such as double data rate (DDR) synchronous dynamic random access memory (SDRAM), as a non-limiting example.

The processor-based device 100 of FIG. 1 may encompass any one of known digital logic elements, semiconductor circuits, processing cores, and/or memory structures, among other elements, or combinations thereof. Aspects described herein are not restricted to any particular arrangement of elements, and the disclosed techniques may be easily extended to various structures and layouts on semiconductor dies or packages. It is to be understood that some aspects of the processor-based device 100, the RN-F circuits 102(0)-102(R), and/or the HN-F circuit 106 may include elements in addition to those illustrated in FIG. 1, and/or may include more or fewer of the elements illustrated in FIG. 1. For example, the processor-based device 100 may further include caches, controllers, communications buses, and/or persistent storage devices, which are omitted from FIG. 1 for the sake of clarity.

In the example of FIG. 1, the RN-F circuits 102(0)-102(R) include corresponding L2 caches 112(0)-112(R) and L3 caches 114(0)-114(R). The L2 caches 112(0)-112(R) and L3 caches 114(0)-114(R) are used to store frequently accessed data for faster access, and represent levels in a multilevel cache hierarchy. Accordingly, it is to be understood that the RN-F circuits 102(0)-102(R) in some aspects may contain more or fewer cache levels than the L2 caches 112(0)-112(R) and L3 caches 114(0)-114(R) shown in FIG. 1.

RN-F circuits (such as the RN-F circuit 102(0), in this example) send transaction requests (e.g., the transaction request 116 of FIG. 1) to the HN-F circuit 106. The transaction request 116 specifies a memory address 118 that indicates, for example, a memory location in the SN-F circuit 110 that the RN-F circuit 102(0) seeks to access, or a cache line (not shown) that the RN-F circuit 102(0) stores in one of the L2 cache 112(0) and the L3 cache 114(0) or moves between the L2 cache 112(0) and the L3 cache 114(0) (or vice versa). The HN-F circuit 106 is configured to order transaction requests such as the transaction request 116, and to implement a cache coherence protocol to ensure that the RN-F circuits 102(0)-102(R) all have a same consistent view of data.

To maintain cache coherence, the HN-F circuit 106 provides a snoop filter 120 that comprises a plurality of snoop filter entries 122(0)-122(S). Each of the snoop filter entries 122(0)-122(S) stores a corresponding memory address (captioned as "MEM ADDR" in FIG. 1) 124(0)-124(S) of a cache line that is cached in one or more of the L2 caches 112(0)-112(R) and the L3 caches 114(0)-114(R) of the RN-F circuit 102(0), along with metadata (not shown) indicating, e.g., where the cache line is cached. Upon receiving a transaction seeking to read or write data, the HN-F circuit 106 consults the snoop filter 120 to determine whether any of the L2 caches 112(0)-112(R) or L3 caches 114(0)-114(R) of the RN-F circuits 102(0)-102(R) store the requested data. If so, the HN-F circuit 106 can send snoops (not shown) only to a particular one of the RN-F circuits 102(0)-102(R) (or only to a subset of the RN-F circuits 102(0)-102(R)) indicated by the snoop filter 120 as storing the requested data. In this manner, the total number of snoops sent via the interconnect 104 may be reduced, thereby improving performance by reducing latency and traffic bandwidth.

However, because the snoop filter 120 is an associative array with a finite capacity, the HN-F circuit 106 must implement a policy for selecting one of the snoop filter entries 122(0)-122(S) to "victimize" or reallocate when the need arises to add a new cache line but the snoop filter 120 is full. It may be desirable for such a victimization policy to be able to take into account factors such as recency of reuse of each snoop filter entry 122(0)-122(S), the cache level at which a cache line corresponding to the memory address 124(0)-124(S) of each snoop filter entry 122(0)-122(S) is stored by an RN-F circuit 102(0)-102(R), a number of copies of the cache line corresponding to the memory address 124(0)-124(S) of each snoop filter entry 122(0)-122(S), and a past history of victim selection, as non-limiting examples.

In this regard, the HN-F circuit 106 is configured to store victimization priority values (captioned as "VIC PRIORITY" in FIG. 1) 126(0)-126(S) as part of the snoop filter entries 122(0)-122(S). Each of the victimization priority values 126(0)-126(S) comprises a data value corresponding to a victimization priority level (not shown) that indicates a relative preference for the corresponding snoop filter entry 122(0)-122(S) to be selected for victimization, should no available snoop filter entries 122(0)-122(S) be available for allocation. Exemplary victimization priority levels are discussed in greater detail below with respect to FIG. 2. As a general rule, snoop filter entries 122(0)-122(S) that store victimization priority values 126(0)-126(S) that correspond to higher victimization priority levels will be victimized and reallocated before snoop filter entries 122(0)-122(S) that store victimization priority values 126(0)-126(S) that correspond to lower victimization priority levels. In some aspects, the victimization priority values 126(0)-126(S) may be stored as a replacement state (RS) indicator having a size of three (3) bits.

In exemplary operation, the HN-F circuit 106 receives the transaction request 116 comprising the memory address 118 from the RN-F circuit 102(0). The HN-F circuit 106 then determines a victimization priority value (captioned as "VIC PRIORITY" in FIG. 1) 128 for the memory address 118 based on the transaction request 116. Exemplary criteria and operations for determining the victimization priority value 128 according to some aspects are discussed in greater detail below with respect to FIG. 3.

The HN-F circuit 106 then determines whether any snoop filter entry among the snoop filter entries 122(0)-122(S) of the snoop filter 120 of the HN-F circuit 106 stores the memory address 118. If not, the HN-F circuit 106 allocates one of the snoop filter entries 122(0)-122(S) to store the memory address 118 and the corresponding victimization priority value 128. The HN-F circuit 106 thus determines whether the snoop filter 120 has a snoop filter entry among the snoop filter entries 122(0)-122(S) that is available for allocation. If none of the snoop filter entries 122(0)-122(S) are available for allocation, the HN-F circuit 106 selects a target snoop filter entry (e.g., the snoop filter entry 122(0), in this example) that stores a highest victimization priority value 126(0) among the plurality of snoop filter entries 122(0)-122(S). The HN-F circuit 106 reallocates the snoop filter entry 122(0) by storing the memory address 118 in the target snoop filter entry 122(0), and also storing the victimization priority value 128 in the target snoop filter entry 122(0) as the victimization priority value 126(0).

Some aspects may further provide that, if the HN-F circuit 106 determines that a snoop filter entry (the snoop filter entry 122(0), as an example) among the plurality of snoop filter entries 122(0)-122(S) already stores the memory address 118, the HN-F circuit 106 updates the victimization priority value 126(0) of the snoop filter entry 122(0) with the victimization priority value 128. If the HN-F circuit 106 determines that no snoop filter entry among the snoop filter entries 122(0)-122(S) stores the memory address 118 but an available snoop filter entry (the snoop filter entry 122(0), as an example) exists, the HN-F circuit 106 stores the memory address 118 in the available snoop filter entry 122(1). The HN-F circuit 106 also stores the victimization priority value 128 in the available snoop filter entry 122(0) as the victimization priority value 126(0).

In some aspects, it may be desirable for older snoop filter entries 122(0)-122(S) in the snoop filter 120 to be preferentially victimized over younger snoop filter entries 122(0)-122(S). Accordingly, such aspects may provide that, after allocating or updating the snoop filter entry 122(0) as described in the examples above, the HN-F circuit 106 also updates one or more of the victimization priority values 126(0)-126(S) among the snoop filter entries 122(0)-122(S) to apply an aging modification to the victimization priority value 126(0)-126(S). The aging modification may comprise increasing one or more of the victimization priority values 126(0)-126(S) based on a difference between a highest victimization priority value among the victimization priority value 126(0)-126(S) and a highest possible victimization priority value.

According to some aspects, it may be desirable for recently victimized and re-added snoop filter entries 122(0)-122(S) to be assigned reduced victimization priority values when re-added to the snoop filter 120. In this regard, the HM-F circuit 106 may further comprise a VHB 130. The VHB 130 includes a plurality of VHB entries 132(0)-132(V) that store corresponding memory addresses (captioned as "MEM ADDR" in FIG. 1) 134(0)-134(V) of snoop filter entries 122(0)-122(S) recently evicted from the snoop filter 120. When victimizing a target snoop filter entry such as the snoop filter entry 122(0), the HN-F circuit 106 allocates a VHB entry (e.g., the VHB entry 132(0) of FIG. 1) for the target snoop filter entry 122(0). The HN-F circuit 106 stores the memory address 124(0) of the target snoop filter entry 122(0) in the VHB entry 132(0) as the memory address 134(0). When determining the victimization priority value 128, the HN-F circuit 106 consults the VHB 130 to determine whether a VHB entry among the VHB entries 132(0)-132(V) matches the memory address 118 of the transaction request 116. If so, the HN-F circuit 106 determines the victimization priority value 128 as corresponding to a VHB-hit victimization priority level (not shown) that is lower than a corresponding VHB-miss victimization priority level (not shown). Assigning reduced victimization priority values based on the VHB 130 is discussed below in greater detail with respect to FIG. 3.

FIG. 2 provides a table 200 illustrating exemplary victimization priority levels 202(0)-202(6) that may correspond to the victimization priority values 126(0)-126(S) of FIG. 1, according to some aspects. For example, each of the victimization priority levels 202(0)-202(6) may correspond to a numeric value (not shown) that is stored as one of the victimization priority values 126(0)-126(S). In FIG. 2, the victimization priority levels 202(0)-202(6) are shown in order of decreasing victimization priority. Thus, for instance, a snoop filter entry among the snoop filter entries 122(0)-122(S) of FIG. 1 that stores a victimization priority value corresponding to the victimization priority level 202(2) would be selected for victimization before a snoop filter entry that stores a victimization priority value corresponding to the victimization priority level 202(5).

As seen in FIG. 2, the highest victimization priority level is an L3 Least Recently Used (LRU) victimization priority level 202(0). The L3 LRU victimization priority level 202(0) indicates that only one (1) copy of a cache line corresponding to the memory address stored in an associated snoop filter entry (e.g., the memory address 124(0) stored in the snoop filter entry 122(0) of FIG. 1) exists among the L2 caches 112(0)-112(R) and L3 caches 114(0)-114(R) of the RN-F circuits 102(0)-102(R) of FIG. 1, and further that the copy is stored as an LRU entry in an L3 cache (e.g., one of the L3 caches 114(0)-114(R) of FIG. 1). Next in descending victimization priority is an L3 Most Recently Used (MRU) victimization priority level 202(1), which indicates that only one (1) copy of the cache line corresponding to the memory address 124(0) exists and is stored as an MRU entry in the L3 cache. The victimization priority levels 202(0) and 202(1) may be collectively referred to herein as "L3 victimization priority levels."

The next lower victimization priority level is an L2 LRU victimization priority level 202(2) that indicates that that only one (1) copy of the cache line corresponding to the memory address 124(0) exists and is stored as an LRU entry in an L2 cache (e.g., one of the L2 caches 112(0)-112(R) of FIG. 1). Following that is an L2 Aging$_1$ victimization priority level 202(3) indicating that only one (1) copy of the cache line corresponding to the memory address 124(0) exists, and that copy is stored in the L2 cache and is associated with a first aging level. Similarly, a next lower L2 Aging$_0$ victimization priority level 202(4) indicates that only one (1) copy of the cache line corresponding to the memory address 124(0) exists, and that copy is stored in the L2 cache and is associated with a second aging level. Next is an L2 MRU victimization priority level 202(5) indicating that only one (1) copy of a cache line corresponding to the memory address exists and is stored as an MRU entry in the L2 cache. The victimization priority levels 202(2)-202(5) may be collectively referred to herein as "L2 victimization priority levels." Finally, the lowest victimization priority level shown in FIG. 2 is a More than One Copy victimization priority level 202(6), which indicates that the HN-F circuit 106 has determined that more than one (1) copy of the cache line corresponding to the memory address 124(0) exists among the L2 caches 112(0)-112(R) and L3 caches 114(0)-114(R) of the RN-F circuits 102(0)-102(R).

Note that the ordering of the victimization priority levels 202(0)-202(6) in the example of FIG. 2 reflect relative values assigned to the snoop filter entries 122(0)-122(S) of FIG. 1 based on the attributes of cache lines corresponding to the memory addresses 124(0)-124(S) (which, in turn, are based on memory addresses of transaction requests such as the memory address 118 of the transaction request 116). In particular, the victimization priority levels 202(0)-202(6) indicate that it is more desirable to retain snoop filter entries 122(0)-122(S) that correspond to cache lines stored in L2 caches relative to those corresponding to cache lines stored in L3 caches. The victimization priority levels 202(0)-202(6) also indicate that it is more desirable to retain snoop filter entries 122(0)-122(S) that correspond to cache lines stored as MRU entries relative to those corresponding to cache lines stored as LRU entries. The victimization priority levels 202(0)-202(6) further reflect the desirability of retaining snoop filter entries 122(0)-122(S) that correspond to cache lines having multiple copies stored across system caches relative to those for which only one (1) copy is stored. It is to be understood that, in some aspects, the victimization priority levels 202(0)-202(6) may be arranged in a different priority order to reflect the needs of particular implementations, and/or may include more, fewer, and/or different victimization priority levels than shown in FIG. 2. For example, the references to L2 caches and L3 caches in describing the victimization priority levels 202(0)-202(6) are non-limiting examples, such that the snoop filter entries 122(0)-122(S) and the victimization priority levels 202(0)-202(6) in some embodiments may address the use of more, fewer, and/or different cache levels.

Figure 3:
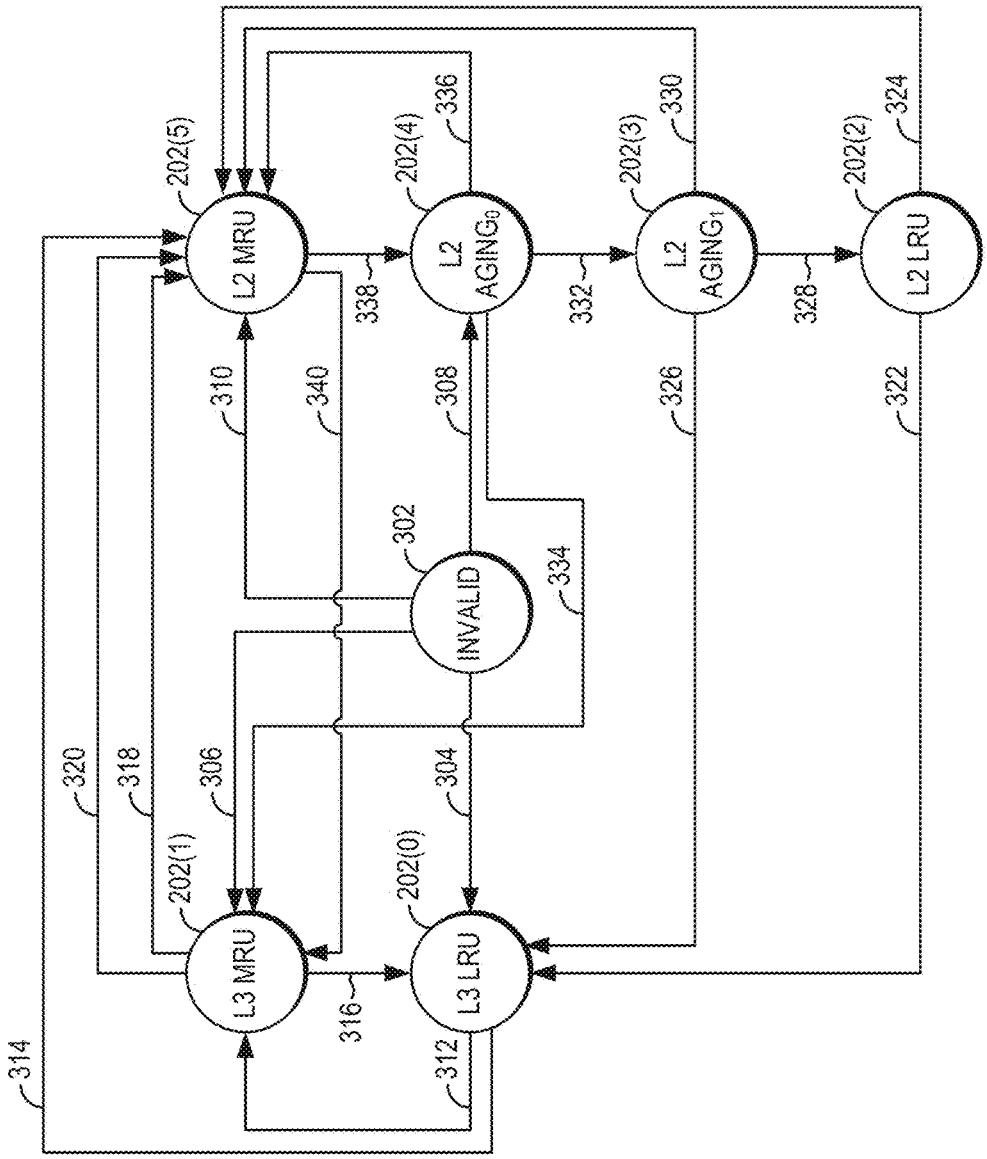
FIG. 3 illustrates a finite state machine (FSM) showing exemplary transitions between the victimization priority levels of FIG. 2 that may be performed by the HN-F circuit of FIG. 1, according to some aspects.

The HN-F circuit 106 of FIG. 1 is configured to determine victimization priority values such as the victimization priority value 126(0) for the snoop filter entry 122(0) based on corresponding transaction requests such as the transaction request 116 of FIG. 1. For example, the victimization priority value 126(0) may be determined based on characteristics of the transaction request 116 such as request type, and may also take into account a pre-existing state or victimization priority value for the snoop filter entry 122(0). In this regard, FIG. 3 shows an exemplary finite state machine (FSM) 300 that illustrates exemplary logic for determining the victimization priority levels 202(0)-202(6) of FIG. 2 by the HN-F circuit 106 of FIG. 1. In particular, the FSM 300 illustrates victimization priority levels that are determined by the HN-F circuit 106 based on a starting state or victimization priority level of a snoop filter entry and a transition condition indicated by the transaction request 116, as shown in Table 1 below:

TABLE 1

| Starting State/Victimization Priority Level of Snoop Filter Entry | Transition Condition(s) | Determined Victimization Priority Level |
|---|---|---|
| Invalid 302 (i.e., available for allocation) | Transaction request 116 is an L3 Stash of request type Atomic, and memory address 118 is not in VHB 130, indicated by arrow 304 | L3 LRU 202(0) |
| Invalid 302 (i.e., available for allocation) | Transaction request 116 is an L3 Stash of request type Atomic, and memory address 118 is in VHB 130, indicated by arrow 306 | L3 MRU 202(1) |
| Invalid 302 (i.e., available for allocation) | Transaction request 116 has request type Allocating Read or MakeUnique, and memory address 118 is not in VHB 130, indicated by arrow 308 | L2 Aging$_0$ 202(4) |
| Invalid 302 (i.e., available for allocation) | Transaction request 116 has request type Allocating Read or MakeUnique, and memory address 118 is in VHB 130, indicated by arrow 310 | L2 MRU 202(5) |
| L3 LRU 202(0) | Transaction request 116 has request type Allocating Read or MakeUnique and is L3CopyNotInvalidatedInSnoop, indicated by arrow 312 | L3 MRU 202(1) |
| L3 LRU 202(0) | Transaction request 116 is L3CopyInvalidates by snooping and has request type Allocating Read or MakeUnique or CleanUnique, indicated by arrow 314 | L2 MRU 202(5) |
| L3 MRU 202(1) | Aging modification, indicated by arrow 316 | L3 LRU 202(0) |
| L3 MRU 202(1) | Transaction request 116 is L3CopyInvalidates by snooping by and has request type Allocating Read or MakeUnique or CleanUnique, indicated by arrow 318 | L2 MRU 202(5) |
| L3 MRU 202(1) | Transaction request 116 is L3CopyEviction while there still exists at least one L2 copy, indicated by arrow 320 | L2 MRU 202(5) |
| L2 LRU 202(2) | Transaction request 116 is L3 Stash and has request type WriteEvictFull, WriteEvictorEvict, WriteBackFull, or Atomic, indicated by arrow 322 | L3 LRU 202(0) |
| L2 LRU 202(2) | Transaction request 116 has request type AllocatingRead or MakeUnique, indicated by arrow 324 | L2 MRU 202(5) |
| L2 Aging$_1$ 202(3) | Transaction request 116 is L3 Stash and has request type WriteEvictFull, WriteEvictorEvict, WriteBackFull, or Atomic, indicated by arrow 326 | L3 LRU 202(0) |
| L2 Aging$_1$ 202(3) | Aging modification, indicated by arrow 328 | L2 LRU 202(2) |
| L2 Aging$_1$ 202(3) | Transaction request 116 has request type AllocatingRead or MakeUnique, indicated by arrow 330 | L2 MRU 202(5) |

TABLE 1-continued

| Starting State/ Victimization Priority Level of Snoop Filter Entry | Transition Condition(s) | Determined Victimization Priority Level |
|---|---|---|
| L2 Aging$_0$ 202(4) | Aging modification, indicated by arrow 332 | L2 Aging$_1$ 202(3) |
| L2 Aging$_0$ 202(4) | Transaction request 116 is L3 Stash and has request type WriteEvictFull, WriteEvictorEvict, WriteBackFull, or Atomic, indicated by arrow 334 | L3 MRU 202(1) |
| L2 Aging$_0$ 202(4) | Transaction request 116 has request type AllocatingRead or MakeUnique, indicated by arrow 336 | L2 MRU 202(5) |
| L2 MRU 202(5) | Aging modification, indicated by arrow 338 | L2 Aging$_0$ 202(4) |
| L2 MRU 202(5) | Transaction request 116 is L3 Stash and has request type WriteEvictFull, WriteEvictorEvict, WriteBackFull, or Atomic, indicated by arrow 340 | L3 MRU 202(1) |

As noted in Table 1 above, in some aspects, when the HN-F circuit 106 allocates an available snoop filter entry 122(0)-122(S) (i.e., a snoop filter entry having a state of Invalid 302), the HN-F circuit may determine that the memory address 118 is stored in a VHB entry of the plurality of VHB entries 132(0)-132(V) of the VHB 130. If so, the HN-F circuit 106 determines the victimization priority value 126(0) as corresponding to a VHB-hit victimization priority level (i.e., the L3 MRU victimization priority level 202(1) or the L2 MRU victimization priority level 202(5)) that is lower than a corresponding VHB-miss victimization priority level (i.e., the L3 LRU victimization priority level 202(0) or the L2 Aging$_0$ victimization priority level 202(4)). The HN-F circuit 106 also deallocates the VHB entry 132(4). However, if the HN-F circuit 106 determines that the memory address 118 is not stored among the plurality of VHB entries 132(0)-132(V), the HN-F circuit 106 determines the victimization priority value 126(0) as corresponding to the VHB-miss victimization priority level 202(0), 202(4).

Table 1 also shows that, in some aspects, the HN-F circuit 106 may determine whether the memory address 118 corresponds to a cache line moved from an L3 cache to an L2 cache. In such cases, the HN-F circuit 106 determines the victimization priority value 126(0) as corresponding to an L2 victimization priority level (e.g., the L2 MRU victimization priority level 202(5)) that is lower than an L3 victimization priority level (e.g., the L3 LRU victimization priority level 202(0) or the L3 MRU victimization priority level 202(1)). The HN-F circuit 106 according to some aspects may determine whether the memory address 118 is stored in an L2 cache and a request type of the transaction request 116 is one of AllocatingRead and MakeUnique. The HN-F circuit 106 in such cases determines the victimization priority value 126(0) as corresponding to a lowest L2 victimization priority level (e.g., the L2 MRU victimization priority level 202(5)). Some aspects may provide that, if the HN-F circuit 106 determines that the transaction request 116 is an L3 stash request having a request type of one of WriteEvictFull, WriteEvictorEvict, WriteBackFull, and Atomic, the HN-F circuit 106 determines the victimization priority value 126(0) as corresponding to a lowest L3 victimization priority level (e.g., the L3 MRU victimization priority level 202(1)). In some aspects, if the HN-F circuit 106 determines that the memory address 118 is stored in an L3 cache and the transaction request 116 is an L3 Copy Invalidate by snooping having a request type of one of AllocatingRead, MakeUnique, and CleanUnique, the HN-F circuit 106 determines the victimization priority value 126(0) as corresponding to the lowest L2 victimization priority level (e.g., the L2 MRU victimization priority level 202(5)).

It is to be understood that, in some embodiments, the initial victimization priority levels assigned to a memory address and priority levels such as the VHB-hit victimization priority level and the VHB-miss victimization priority level may be configurable. For example, a processor-based device may provide a plurality of registers that each can be set to indicate which of the victimization priority levels 202(0)-202(6) are to be assigned in response to the determinations discussed above. In this manner, the victimization priority levels assigned for each scenario may be dynamically fine-tuned.

Figure 4A:
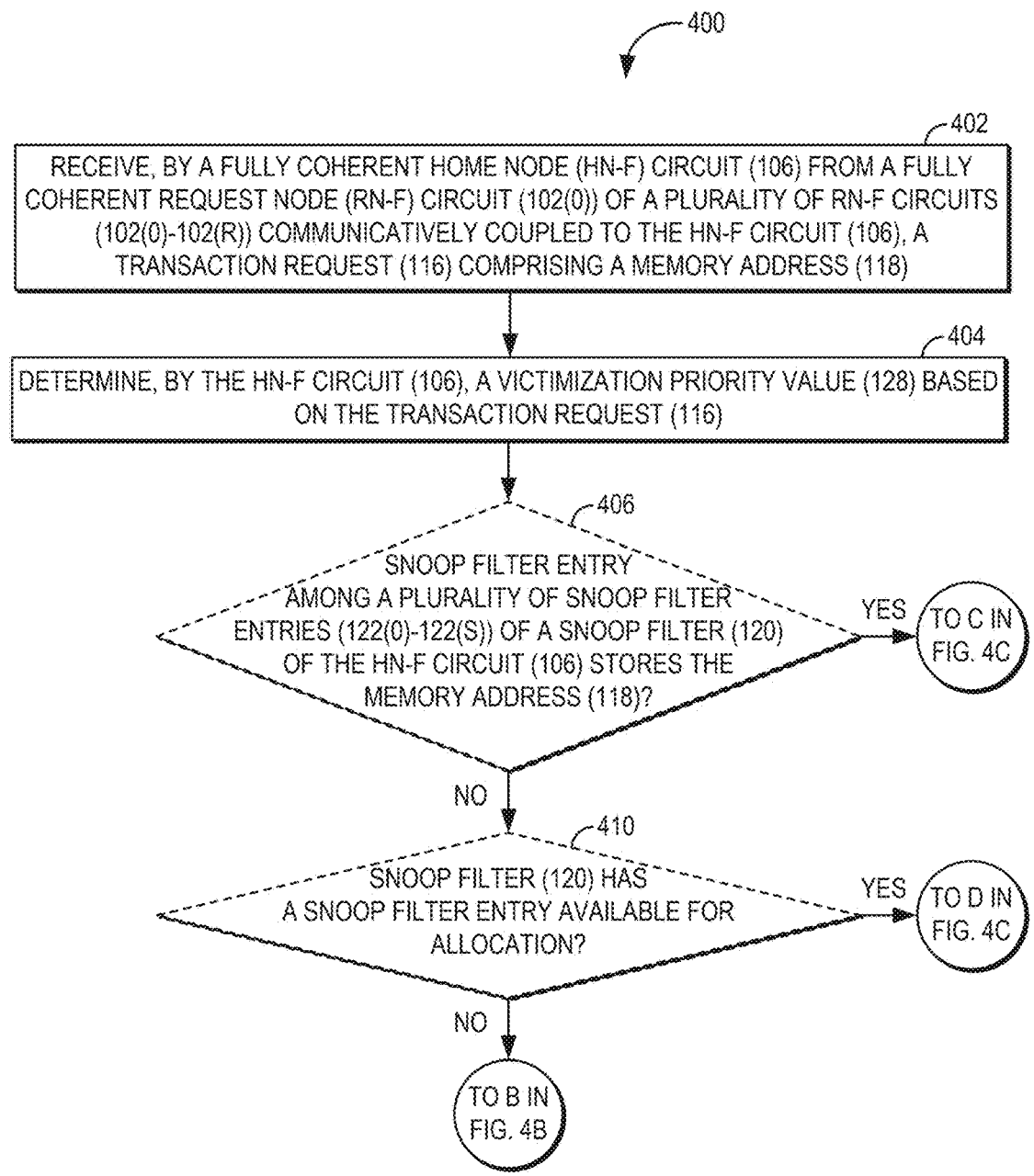
FIGS. 4A-4C show a flowchart illustrating exemplary operations performed by the HN-F circuit of FIG. 1 for performing snoop filter replacement based on history-augmented victimization priority values of snoop filter entries in processor-based devices, according to some aspects.
Figure 4B:
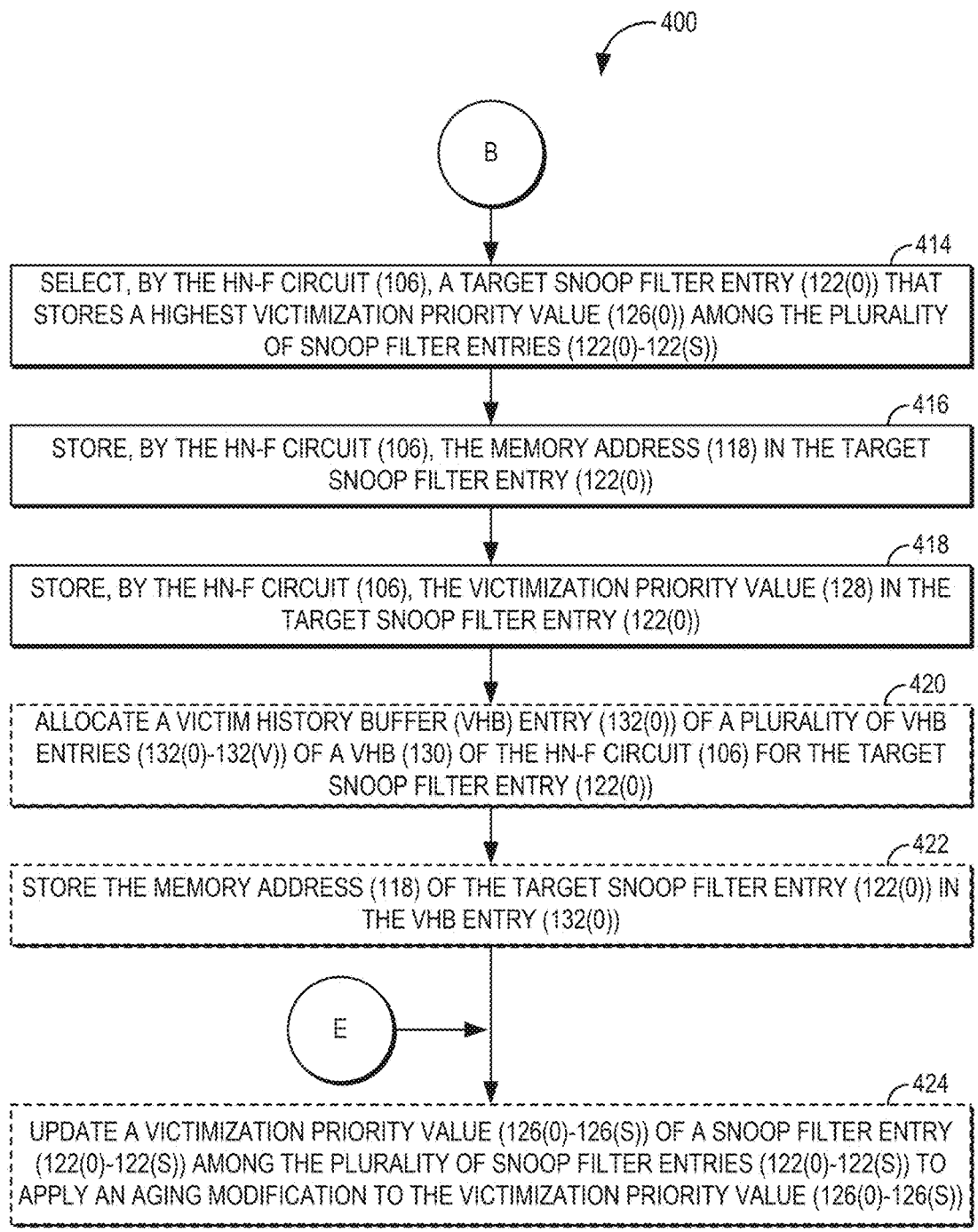
Figure 4C:
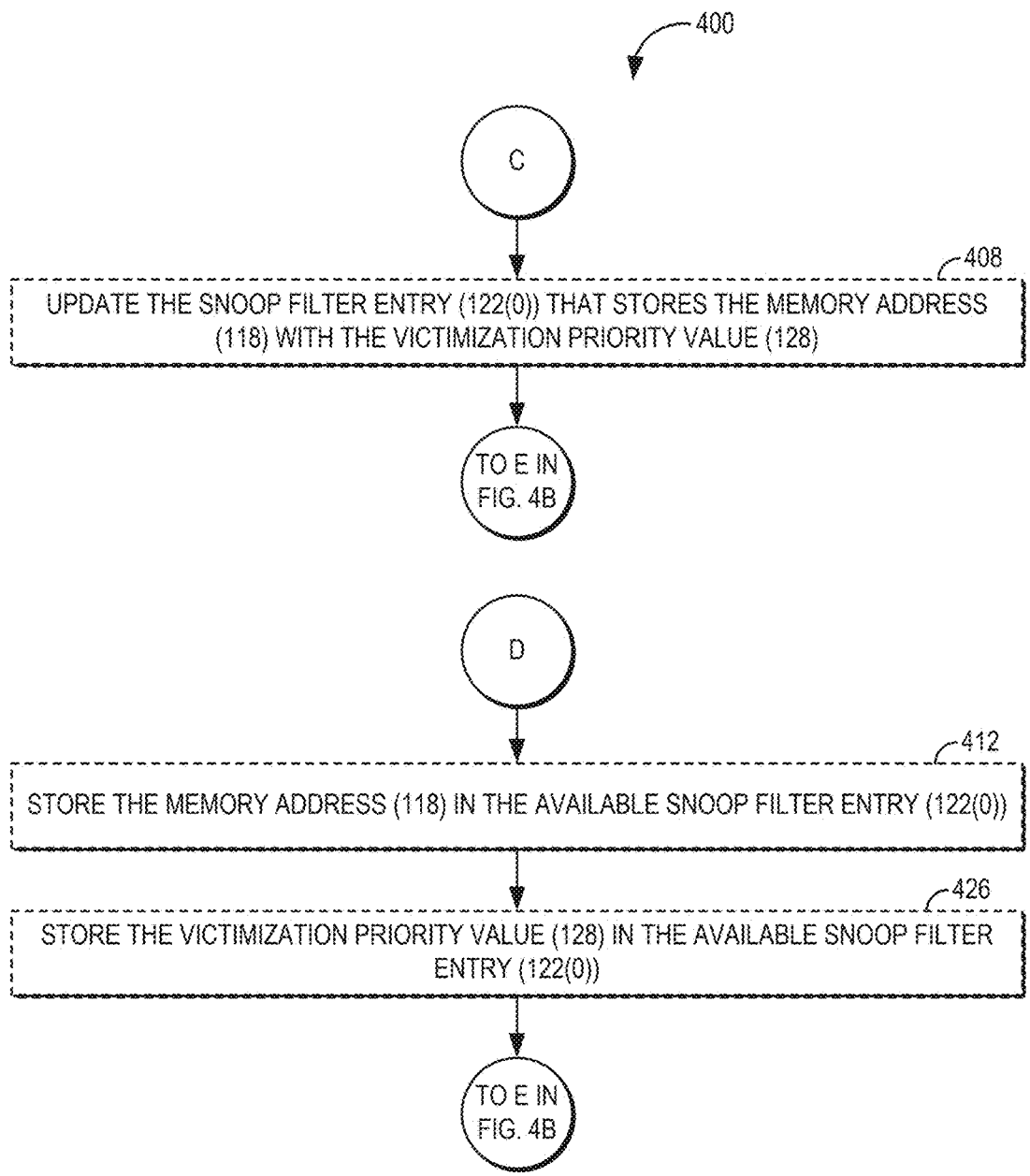

To illustrate exemplary operations performed by the HN-F circuit 106 of FIG. 1 for performing snoop filter replacement based on history-augmented victimization priority values of snoop filter entries according to some aspects, FIGS. 4A-4C provide a flowchart showing exemplary operations 400. Elements of FIG. 1 are referenced in describing FIGS. 4A-4C for the sake of clarity. It is to be understood that some aspects may provide that some of the exemplary operations 400 are performed in an order other than that shown in FIGS. 4A-4C, and/or are omitted.

The exemplary operations 400 begin in FIG. 4A with an HN-F circuit (e.g., the HN-F circuit 106 of FIG. 1) receiving, from an RN-F circuit of a plurality of RN-F circuits communicatively coupled to the HN-F circuit 106 (such as the RN-F circuit 102(0) of the plurality of RN-F circuits 102(0)-102(R) of FIG. 1), a transaction request (e.g., the transaction request 116 of FIG. 1) comprising a memory address (such as the memory address 118 of FIG. 1) (block 402). The HN-F circuit 106 determines a victimization priority value based on the transaction request 116 (e.g., the victimization priority value 128 of FIG. 1) (block 404). In some aspects, the operations of block 404 for determining the victimization priority value 128 may comprise the exemplary operations 500 discussed below with respect to FIG. 5, and/or the exemplary operations 600 discussed below with respect to FIGS. 6A-6B.

The HN-F circuit 106 determines whether any snoop filter entry among a plurality of snoop filter entries of a snoop filter of the HN-F circuit 106 (such as the snoop filter entries 122(0)-122(S) of the snoop filter 120 of FIG. 1) stores the memory address 118 (block 406). If so, the exemplary operations 400 in some aspects may continue at block 408 in FIG. 4C. If the HN-F circuit 106 determines at decision block 406 that no snoop filter entry among the plurality of snoop filter entries 122(0)-122(S) stores the memory address 118, the HN-F circuit 106 in some aspects may next determine whether the snoop filter 120 has a snoop filter entry available for allocation (block 410). If there are available snoop filter entries among plurality of snoop filter entries 122(0)-122(S), the exemplary operations 400 may continue at block 412 of FIG. 4C. However, if no snoop filter entries are available for allocation, the exemplary operations 400 continue at block 414 of FIG. 4B.

Referring now to FIG. 4B, if the HN-F circuit 106 determines at decision block 410 of FIG. 4A that no snoop filter entries are available for allocation, the HN-F circuit 106 selects a target snoop filter entry (e.g., the snoop filter entry 122(0) of FIG. 1) that stores a highest victimization priority value (e.g., the victimization priority value 126(0) of FIG. 1) among the plurality of snoop filter entries 122(0)-122(S) (block 414). The HN-F circuit 106 then stores the memory address 118 in the target snoop filter entry 122(0) (e.g., by storing the memory address 118 as the memory address 124(0)) (block 416). The HN-F circuit 106 also stores the victimization priority value 128 in the target snoop filter entry 122(0) (e.g., by storing the victimization priority value 128 as the victimization priority value 126(0)) (block 418).

In aspects in which the HN-F circuit 106 comprises a VHB such as the VHB 130 of FIG. 1, the HN-F circuit 106 may also allocate a VHB entry of a plurality of VHB entries (e.g., the VHB entry 132(0) of the plurality of VHB entries 132(0)-132(V) of FIG. 1) of the VHB 130 of the HN-F circuit 106 for the target snoop filter entry 122(0) (block 420). The HN-F circuit 106 then stores the memory address 118 of the target snoop filter entry 122(0) in the VHB entry 132(0) (i.e., before storing the memory address 118 in the target snoop filter entry 122(0)) (block 422). Some aspects may also provide that the HN-F circuit 106 updates a victimization priority value (such as the victimization priority values 126(0)-126(S) of FIG. 1) of a snoop filter entry (e.g., the snoop filter entries 122(0)-122(S) of FIG. 1) among the plurality of snoop filter entries 122(0)-122(S) to apply an aging modification to the victimization priority value 126(0)-126(S) (block 424).

Turning now to FIG. 4C, in some aspects, if the HN-F circuit 106 determines at decision block 406 of FIG. 4A that a snoop filter entry (such as the snoop filter entry 122(0) of FIG. 1) among the plurality of snoop filter entries 122(0)-122(S) stores the memory address 118, the HN-F circuit 106 updates the snoop filter entry 122(0) that stores the memory address 118 with the victimization priority value 128 (e.g., by storing the victimization priority value 128 as the victimization priority value 126(0)) (block 408). The exemplary operations 400 in such aspects may then continue at block 424 of FIG. 4B.

Some aspects may provide that if the HN-F circuit 106 determines at decision block 410 of FIG. 4A that an available snoop filter entry (e.g., the snoop filter entry 122(0) of FIG. 1) exists for allocation among plurality of snoop filter entries 122(0)-122(S), the HN-F circuit 106 stores the memory address 118 in the available snoop filter entry 122(0) (e.g., by storing the memory address 118 as the memory address 124(0)) (block 412). The HN-F circuit 106 also stores the victimization priority value 128 in the available snoop filter entry 122(0) (e.g., by storing the victimization priority value 128 as the victimization priority value 126(0)) (block 426). The exemplary operations 400 in such aspects may then continue at block 424 of FIG. 4B.

Figure 5:
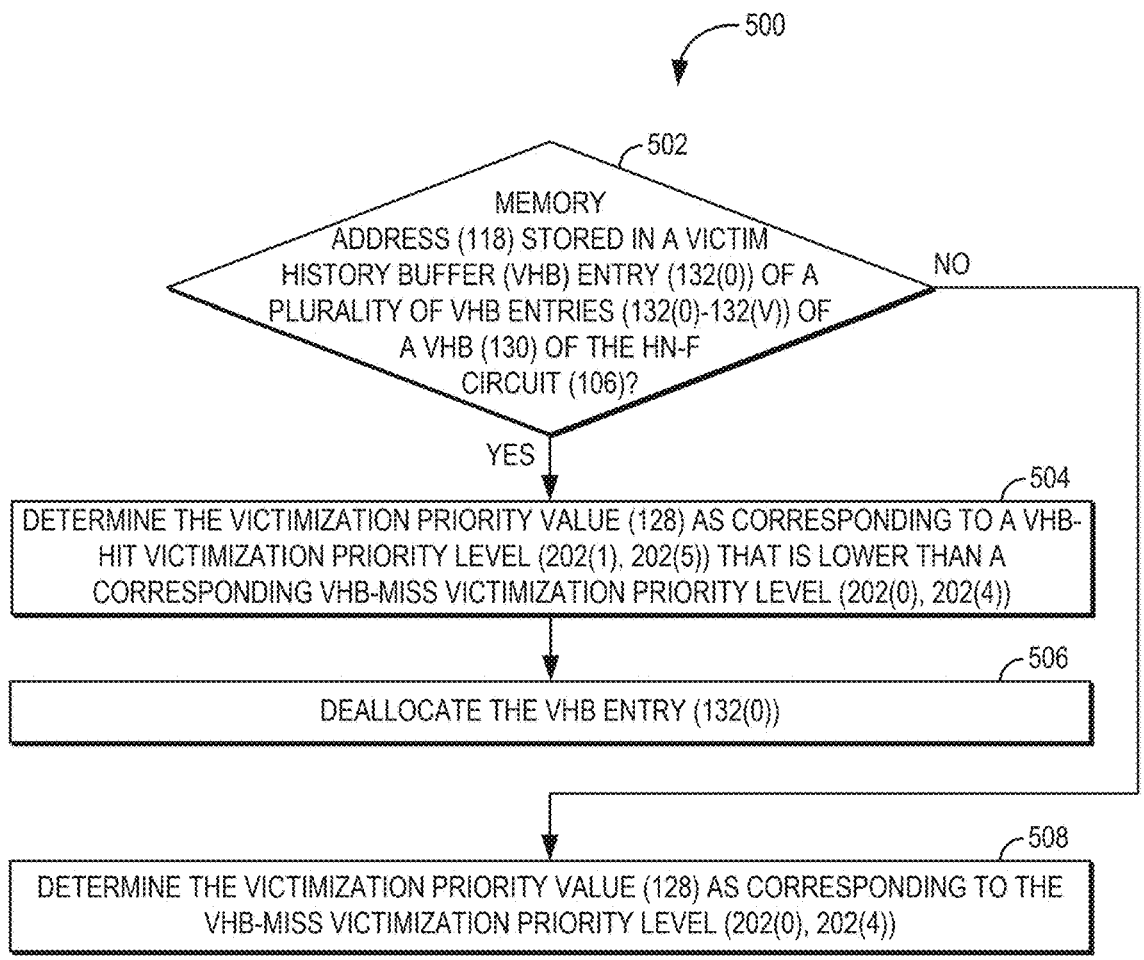
FIG. 5 provides a flowchart illustrating additional exemplary operations performed by the HN-F circuit of FIG. 1 for adjusting victimization priorities based on the VHB of FIG. 1, according to some aspects.

FIG. 5 provides a flowchart showing exemplary operations 500 that may be performed by the HN-F circuit 106 of FIG. 1 to adjust victimization priorities based on a VHB such as the VHB 130 of FIG. 1, according to some aspects. For the sake of clarity, elements of FIGS. 1 and 2 are referenced in describing FIG. 5. It is to be understood that the exemplary operations 500 may correspond to the operations of block 404 of FIG. 4A for determining the victimization priority value 128 in some aspects.

The exemplary operations 500 begin in FIG. 5 with the HN-F circuit 106 determining whether a memory address (e.g., the memory address 118 of FIG. 1) is stored in a VHB entry of a plurality of VHB entries (such as the VHB entry 132(0) of the plurality of VHB entries 132(0)-132(V) of FIG. 1) of the VHB 130 of the HN-F circuit 106 (block 502). If so, the HN-F circuit 106 determines a victimization priority value (e.g., the victimization priority value 128 of FIG. 1) as corresponding to a VHB-hit victimization priority level (such as the L3 MRU victimization priority level 202(1) or the L2 MRU victimization priority level 202(5) of FIG. 2) that is lower than a corresponding VHB-miss victimization priority level (e.g., the L3 LRU victimization priority level 202(0) or the L2 Aging$_0$ victimization priority level 202(4) of FIG. 2) (block 504). The HN-F circuit 106 also deallocates the VHB entry 132(0) (block 506). However, if the HN-F circuit 106 determines at decision block 502 that the memory address 118 is not stored among the plurality of VHB entries 132(0)-132(V), the HN-F circuit 106 determines the victimization priority value 128 as corresponding to the VHB-miss victimization priority level 202(0), 202(4) (block 508).

Figure 6A:
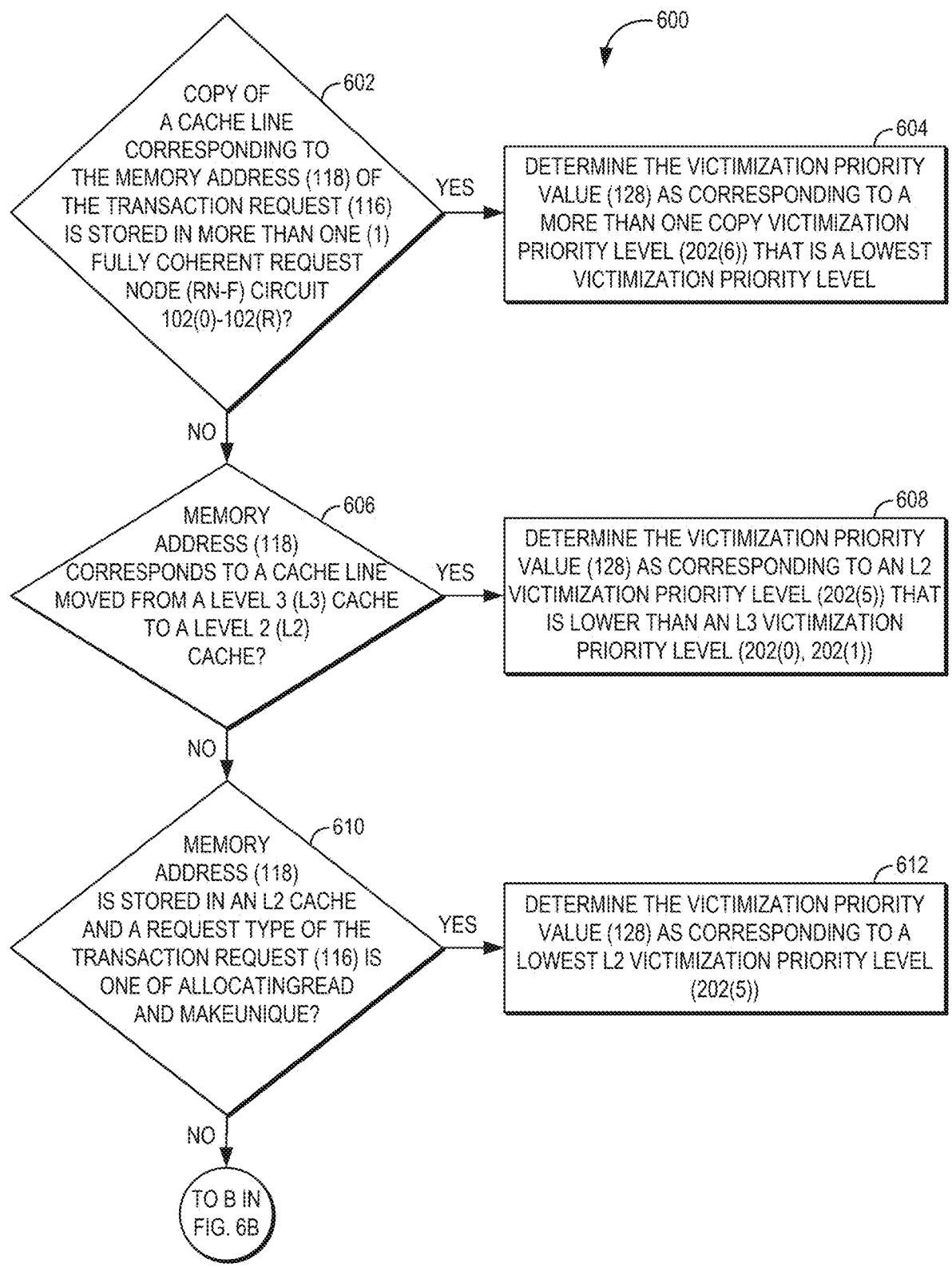
FIGS. 6A-6B provide a flowchart showing additional exemplary operations performed by the HN-F circuit of FIG. 1 for determining victimization priorities based on transaction requests according to some aspects.
Figure 6B:
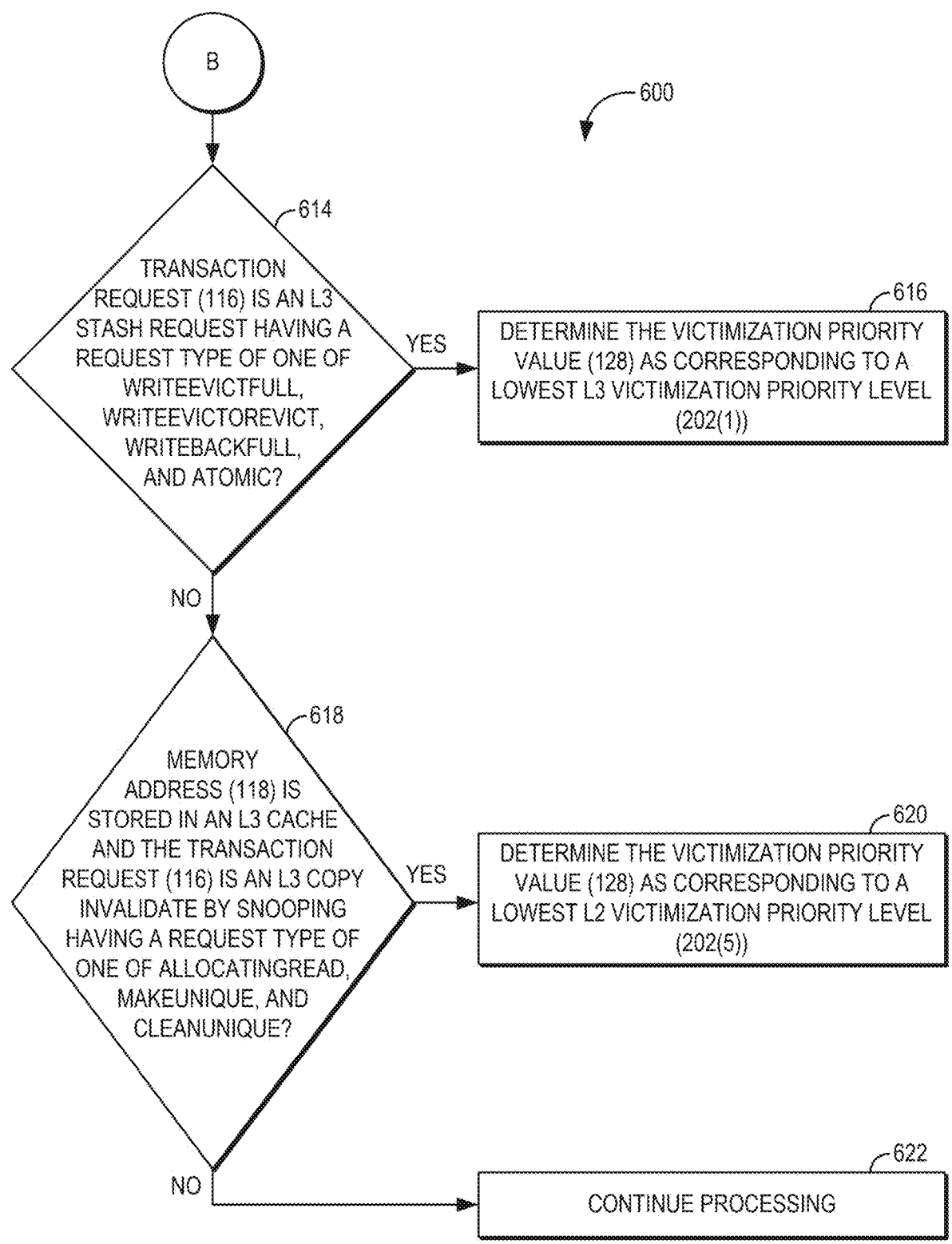

To illustrate exemplary operations that may be performed by the HN-F circuit 106 of FIG. 1 for determining victimization priorities based on transaction requests according to some aspects, FIGS. 6A-6B provide a flowchart illustrating exemplary operations 600. Elements of FIGS. 1 and 2 are referenced in describing FIGS. 6A-6B for the sake of clarity. It is to be understood that the exemplary operations 600 may correspond to the operations of block 404 of FIG. 4A for determining the victimization priority value 128 in some aspects. It is to be further understood that, according to some aspects, some of the exemplary operations 600 may be performed in an order other than that shown in FIGS. 6A-6B, and/or may be omitted.

The exemplary operations 600 begin in FIG. 6A with the HN-F circuit 106 determining whether a copy of a cache line corresponding to a memory address of a transaction request (e.g., the memory address 118 of the transaction request 116 of FIG. 1) is stored in more than one (1) RN-F circuit of a plurality of RN-F circuits (such as the RN-F circuits 102(0)-102(R) of FIG. 1) (block 602). If so, the HN-F circuit determines a victimization priority value (e.g., the victimization priority value 128 of FIG. 1) as corresponding to a More than One Copy victimization priority level (such as the More than One Copy victimization priority level 202(6) of FIG. 2) that is a lowest victimization priority level (block 604).

If the HN-F circuit 106 determines at decision block 602 that only one (1) RN-F circuit among the plurality of RN-F circuits 102(0)-102(R) stores the memory address 118, the HN-F circuit 106 may next determine whether the memory address 118 corresponds to a cache line moved from an L3 cache to an L2 cache (block 606). If so, the HN-F circuit 106 determines the victimization priority value 128 as corresponding to an L2 victimization priority level (e.g., L2 MRU victimization priority level 202(5) of FIG. 2) that is lower than an L3 victimization priority level (such as the L3 LRU victimization priority level 202(0) or the L3 MRU victimization priority level 202(1) of FIG. 2) (block 608).

In the event that the HN-F circuit 106 determines at decision block 606 that the memory address 118 does not correspond to a cache line moved from an L3 cache to an L2 cache, the HN-F circuit 106 according to some aspects may determine whether the memory address 118 is stored in an L2 cache and a request type of the transaction request 116 is one of AllocatingRead and MakeUnique (block 610). If so, the HN-F circuit 106 determines the victimization priority value 128 as corresponding to a lowest L2 victimization priority level (e.g., the L2 MRU victimization priority level 202(5) of FIG. 2) (block 612). If not, the exemplary operations 600 in some aspects may continue at block 614 of FIG. 6B.

Referring now to FIG. 6B, the HN-F circuit 106 next determines whether the transaction request 116 is an L3 stash request having a request type of one of WriteEvictFull, WriteEvictorEvict, WriteBackFull, and Atomic (block 614).

If so, the HN-F circuit 106 determines the victimization priority value 128 as corresponding to a lowest L3 victimization priority level (e.g., the L3 MRU victimization priority level 202(1) of FIG. 2) (block 616). However, if it is determined at decision block 614 that the transaction request 116 is not an L3 stash request having a request type of one of WriteEvictFull, WriteEvictorEvict, WriteBackFull, and Atomic, the HN-F circuit 106 may determine whether the memory address 118 is stored in an L3 cache and the transaction request 116 is an L3 Copy Invalidate by snooping having a request type of one of AllocatingRead, MakeUnique, and CleanUnique (block 618). If so, the HN-F circuit 106 determines the victimization priority value 128 as corresponding to a lowest L2 victimization priority level (e.g., the L2 MRU victimization priority level 202(5) of FIG. 2) (block 620). If not, the HN-F circuit 106 may continue processing of the transaction request 116 by, e.g., assigning a default victimization priority value to the transaction request 116 (block 622).

The exemplary HN-F circuit according to aspects disclosed herein and discussed with reference to FIGS. 1-3, 4A-4C, 5, and 6A-6B may be provided in or integrated into any processor-based device. Examples, without limitation, include a server, a computer, a portable computer, a desktop computer, a mobile computing device, a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a wearable computing device (e.g., a smart watch, a health or fitness tracker, eyewear, etc.), a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, a drone, and a multicopter.

Figure 7:
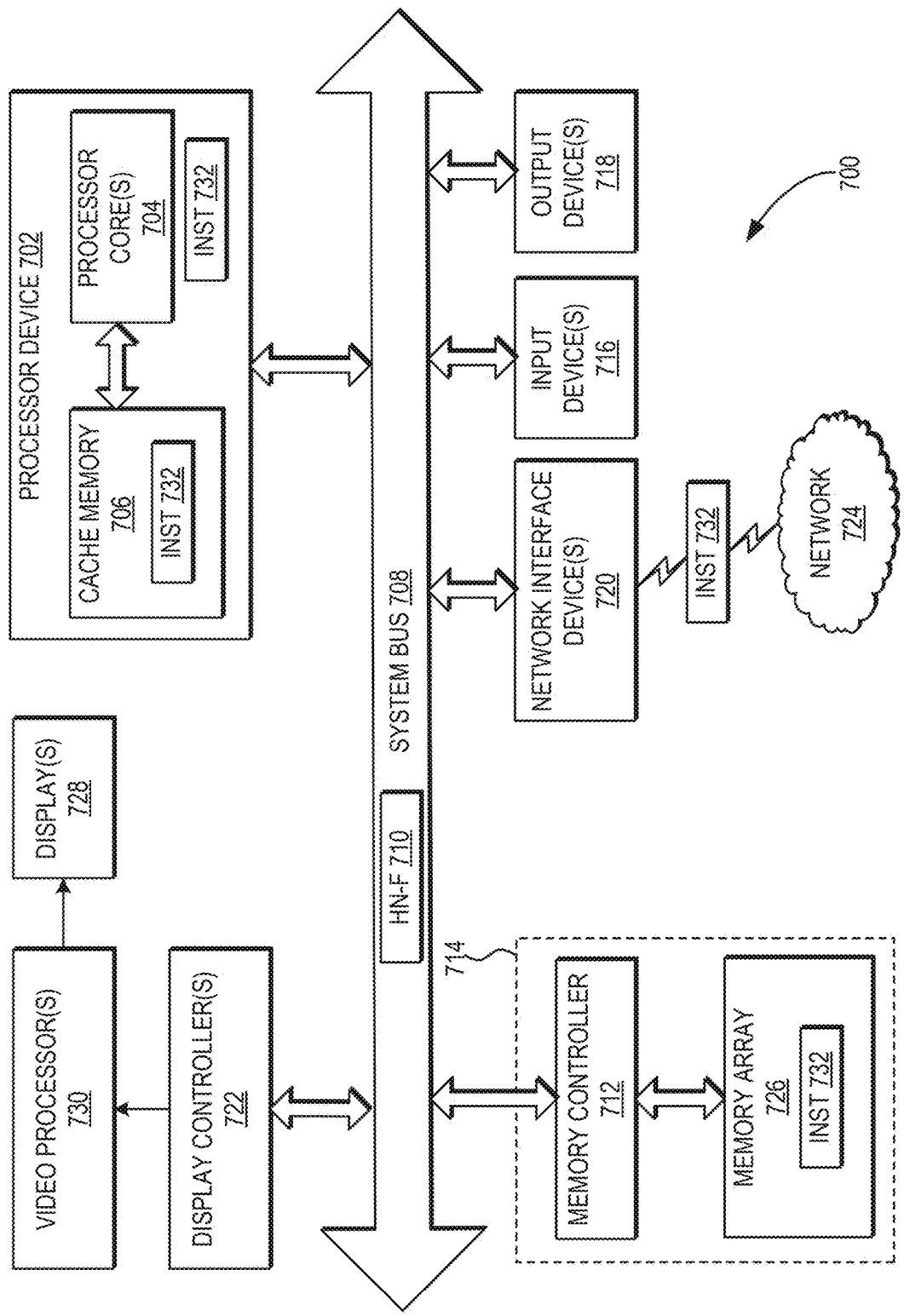
FIG. 7 is a block diagram of an exemplary processor-based system including a processor having an HN-F circuit.

In this regard, FIG. 7 illustrates an example of a processor-based device 700 corresponding in functionality to the processor-based device 100 of FIG. 1. In this example, the processor-based device 700 includes a processor device 702, which comprises one or more processor cores 704 coupled to a cache memory 706. The processor device 702 is also coupled to a system bus 708 and can intercouple devices included in the processor-based device 700. The system bus 708 comprises an interconnect that includes an HN-F circuit (captioned as "HN-F" in FIG. 7) 710 that corresponds in functionality to the HN-F circuit 106 of FIG. 1. As is well known, the processor device 702 communicates with these other devices by exchanging address, control, and data information over the system bus 708. For example, the processor device 702 can communicate bus transaction requests to a memory controller 712. Although not illustrated in FIG. 7, multiple system buses 708 could be provided, wherein each system bus 708 constitutes a different fabric.

Other devices may be connected to the system bus 708. As illustrated in FIG. 7, these devices can include a memory system 714, one or more input devices 716, one or more output devices 718, one or more network interface devices 720, and one or more display controllers 722, as examples. The input device(s) 716 can include any type of input device, including, but not limited to, input keys, switches, voice processors, etc. The output device(s) 718 can include any type of output device, including, but not limited to, audio, video, other visual indicators, etc. The network interface device(s) 720 can be any devices configured to allow exchange of data to and from a network 724. The network 724 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 720 can be configured to support any type of communications protocol desired. The memory system 714 can include the memory controller 712 coupled to one or more memory arrays 726.

The processor device 702 may also be configured to access the display controller(s) 722 over the system bus 708 to control information sent to one or more displays 728. The display controller(s) 722 sends information to the display(s) 728 to be displayed via one or more video processors 730, which process the information to be displayed into a format suitable for the display(s) 728. The display(s) 728 can include any type of display, including, but not limited to, a cathode ray tube (CRT), a liquid crystal display (LCD), a plasma display, a light emitting diode (LED) display, etc.

The processor-based device 700 in FIG. 7 may include a set of instructions (captioned as "INST" in FIG. 7) 732 that may be executed by the processor device 702 for any application desired according to the instructions. The instructions 732 may be stored in the memory system 714, the processor device 702, and/or the cache memory 706, each of which may comprise an example of a non-transitory computer-readable medium. The instructions 732 may also reside, completely or at least partially, within the memory system 714 and/or within the processor device 702 during their execution. The instructions 732 may further be transmitted or received over the network 724, such that the network 724 may comprise an example of a computer-readable medium.

While the computer-readable medium is described in an exemplary embodiment herein to be a single medium, the term "computer-readable medium" should be taken to include a single medium or multiple media (e.g., a centralized or distributed database, and/or associated caches and servers) that store the set of instructions 732. The term "computer-readable medium" shall also be taken to include any medium that is capable of storing, encoding, or carrying a set of instructions for execution by a processing device and that cause the processing device to perform any one or more of the methodologies of the embodiments disclosed herein. The term "computer-readable medium" shall accordingly be taken to include, but not be limited to, solid-state memories, optical medium, and magnetic medium.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The master devices and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein, but is to be accorded the widest scope consistent with the principles and novel features disclosed herein.

What is claimed is:

1. A Fully Coherent Home Node (HN-F) circuit, comprising a snoop filter storing a plurality of snoop filter entries;
   each snoop filter entry configured to store a memory address and a victimization priority value for the memory address; and
   the HN-F circuit configured to:
     receive, from a first Fully Coherent Request Node (RN-F) circuit of a plurality of RN-F circuits communicatively coupled to the HN-F circuit, a first transaction request comprising a first memory address;
     determine a first victimization priority value based on the first transaction request;
     determine that no snoop filter entry among the plurality of snoop filter entries stores the first memory address;
     determine that the snoop filter has no snoop filter entries available for allocation;
     select a target snoop filter entry that stores a highest victimization priority value among the plurality of snoop filter entries;
     store the first memory address in the target snoop filter entry; and
     store the first victimization priority value in the target snoop filter entry.

2. The HN-F circuit of claim 1, wherein the first victimization priority value corresponds to a victimization priority level of a plurality of victimization priority levels comprising, in order of decreasing victimization priority:
   a Level 3 (L3) Least Recently Used (LRU) victimization priority level indicating that only one (1) copy of a cache line corresponding to the first memory address exists and is stored as an LRU entry in an L3 cache;
   an L3 Most Recently Used (MRU) victimization priority level indicating that only one (1) copy of the cache line corresponding to the first memory address exists and is stored as an MRU entry in the L3 cache;
   a Level 2 (L2) LRU victimization priority level indicating that that only one (1) copy of the cache line corresponding to the first memory address exists and is stored as an LRU entry in an L2 cache;
   an L2 Aging victimization priority level indicating that only one (1) copy of the cache line corresponding to the first memory address exists, is stored in the L2 cache, and is associated with a first aging level;
   an L2 $Aging_0$ victimization priority level indicating that only one (1) copy of the cache line corresponding to the first memory address exists, is stored in the L2 cache, and is associated with a second aging level;
   an L2 MRU victimization priority level indicating that only one (1) copy of the cache line corresponding to the first memory address exists and is stored as an MRU entry in the L2 cache; and
   a More than One Copy victimization priority level indicating that more than one (1) copy of the cache line corresponding to the first memory address exists.

3. The HN-F circuit of claim 1, further comprising a victim history buffer (VHB) storing a plurality of VHB entries;
   the HN-F circuit further configured to:
     allocate a VHB entry of the plurality of VHB entries for the target snoop filter entry; and
     store the memory address of the target snoop filter entry in the VHB entry.

4. The HN-F circuit of claim 1, wherein the HN-F circuit is further configured to:
- receive, from a second RN-F circuit of the plurality of RN-F circuits communicatively coupled to the HN-F circuit, a second transaction request comprising a second memory address;
- determine a second victimization priority value based on the second transaction request;
- determine that the snoop filter has an available snoop filter entry among the plurality of snoop filter entries;
- store the second memory address in the available snoop filter entry; and
- store the second victimization priority value in the available snoop filter entry.

5. The HN-F circuit of claim 4, further comprising a victim history buffer (VHB) storing a plurality of VHB entries;
- the HN-F circuit configured to determine the second victimization priority value based on the second transaction request by being configured to:
  - determine whether the second memory address is stored in a VHB entry of the plurality of VHB entries;
  - responsive to determining that the second memory address is stored in a VHB entry of the plurality of VHB entries:
    - determine the second victimization priority value as corresponding to a VHB-hit victimization priority level that is lower than a corresponding VHB-miss victimization priority level; and
    - deallocate the VHB entry; and
  - responsive to determining that the second memory address is not stored in a VHB entry of the plurality of VHB entries, determine the second victimization priority value as corresponding to the VHB-miss victimization priority level.

6. The HN-F circuit of claim 4, wherein the HN-F circuit is configured to determine the second victimization priority value based on the second transaction request by being configured to:
- determine that a copy of a cache line corresponding to the second memory address is stored in more than one (1) RN-F circuit of the plurality of RN-F circuits; and
- determine the second victimization priority value as corresponding to a More than One Copy victimization priority level that is a lowest victimization priority level.

7. The HN-F circuit of claim 4, wherein the HN-F circuit is configured to determine the second victimization priority value based on the second transaction request by being configured to:
- determine that the second memory address corresponds to a cache line moved from a Level 3 (L3) cache to a Level 2 (L2) cache; and
- determine the second victimization priority value as corresponding to an L2 victimization priority level that is lower than an L3 victimization priority level.

8. The HN-F circuit of claim 1, wherein the HN-F circuit is further configured to:
- receive, from a third RN-F circuit of the plurality of RN-F circuits communicatively coupled to the HN-F circuit, a third transaction request comprising a third memory address;
- determine a third victimization priority value based on the third transaction request;
- determine that a snoop filter entry among the plurality of snoop filter entries stores the third memory address; and
- update the snoop filter entry that stores the third memory address with the third victimization priority value.

9. The HN-F circuit of claim 8, wherein the HN-F circuit is configured to determine the third victimization priority value based on the third transaction request by being configured to:
- determine that the third memory address is stored in a Level 2 (L2) cache and a request type of the third transaction request is one of AllocatingRead and MakeUnique; and
- determine the third victimization priority value as corresponding to a lowest L2 victimization priority level.

10. The HN-F circuit of claim 8, wherein the HN-F circuit is configured to determine the third victimization priority value based on the third transaction request by being configured to:
- determine that the third transaction request is a Level 3 (L3) stash request having a request type of one of WriteEvictFull, WriteEvictorEvict, WriteBackFull, and Atomic; and
- determine the third victimization priority value as corresponding to a lowest L3 victimization priority level.

11. The HN-F circuit of claim 8, wherein the HN-F circuit is configured to determine the third victimization priority value based on the third transaction request by being configured to:
- determine that the third memory address is stored in a Level 3 (L3) cache and the third transaction request is an L3 Copy Invalidate by snooping having a request type of one of AllocatingRead, MakeUnique, and CleanUnique; and
- determine the third victimization priority value as corresponding to a lowest Level 2 (L2) victimization priority level.

12. The HN-F circuit of claim 8, wherein the HN-F circuit is configured to determine the third victimization priority value based on the third transaction request by being configured to:
- determine that that a copy of a cache line corresponding to the third memory address is stored in more than one (1) RN-F circuit of the plurality of RN-F circuits; and
- determine the third victimization priority value as corresponding to a More than One Copy victimization priority level that is a lowest victimization priority level.

13. The HN-F circuit of claim 8, wherein the HN-F circuit is configured to determine the third victimization priority value based on the third transaction request by being configured to:
- determine that the third memory address corresponds to a cache line moved from a Level 3 (L3) cache to a Level 2 (L2) cache; and
- determine the third victimization priority value as corresponding to an L2 victimization priority level that is lower than an L3 victimization priority level.

14. The HN-F circuit of claim 8, wherein the HN-F circuit is configured to update a victimization priority value of a fourth snoop filter entry among the plurality of snoop filter entries to apply an aging modification to the victimization priority value.

15. A processor-based device, comprising:
- means for receiving, from a Fully Coherent Request Node (RN-F) circuit of a plurality of RN-F circuits, a transaction request comprising a memory address;

means for determining a victimization priority value based on the transaction request;

means for determining that no snoop filter entry among a plurality of snoop filter entries of a snoop filter stores the memory address;

means for determining that the snoop filter has no snoop filter entries available for allocation;

means for selecting a target snoop filter entry that stores a highest victimization priority value among the plurality of snoop filter entries;

means for storing the memory address in the target snoop filter entry; and means for storing the victimization priority value in the target snoop filter entry.

16. A method for performing snoop filter replacement based on history-augmented victimization priority values of snoop filter entries, comprising:

receiving, by a Fully Coherent Home Node (HN-F) circuit from a first Fully Coherent Request Node (RN-F) circuit of a plurality of RN-F circuits communicatively coupled to the HN-F circuit, a first transaction request comprising a first memory address;

determining, by the HN-F circuit, a first victimization priority value based on the first transaction request;

determining, by the HN-F circuit, that no snoop filter entry among a plurality of snoop filter entries of a snoop filter of the HN-F circuit stores the first memory address;

determining, by the HN-F circuit, that the snoop filter has no snoop filter entries available for allocation;

selecting, by the HN-F circuit, a target snoop filter entry that stores a highest victimization priority value among the plurality of snoop filter entries;

storing, by the HN-F circuit, the first memory address in the target snoop filter entry; and storing, by the HN-F circuit, the first victimization priority value in the target snoop filter entry.

17. The method of claim 16, wherein the first victimization priority value corresponds to a victimization priority level of a plurality of victimization priority levels comprising, in order of decreasing victimization priority:

a Level 3 (L3) Least Recently Used (LRU) victimization priority level indicating that only one (1) copy of a cache line corresponding to the first memory address exists and is stored as an LRU entry in an L3 cache;

an L3 Most Recently Used (MRU) victimization priority level indicating that only one (1) copy of the cache line corresponding to the first memory address exists and is stored as an MRU entry in the L3 cache;

a Level 2 (L2) LRU victimization priority level indicating that that only one (1) copy of the cache line corresponding to the first memory address exists and is stored as an LRU entry in an L2 cache;

an L2 Aging$_1$ victimization priority level indicating that only one (1) copy of the cache line corresponding to the first memory address exists, is stored in the L2 cache, and is associated with a first aging level;

an L2 Aging$_0$ victimization priority level indicating that only one (1) copy of the cache line corresponding to the first memory address exists, is stored in the L2 cache, and is associated with a second aging level;

an L2 MRU victimization priority level indicating that only one (1) copy of the cache line corresponding to the first memory address exists and is stored as an MRU entry in the L2 cache; and a More than One Copy victimization priority level indicating that more than one (1) copy of the cache line corresponding to the first memory address exists.

18. The method of claim 16, further comprising:

allocating a victim history buffer (VHB) entry of a plurality of VHB entries of a VHB of the HN-F circuit for the target snoop filter entry; and storing the first memory address of the target snoop filter entry in the VHB entry.

19. The method of claim 16, further comprising:

receiving, from a second RN-F circuit of the plurality of RN-F circuits communicatively coupled to the HN-F circuit, a second transaction request comprising a second memory address;

determining a second victimization priority value based on the second transaction request;

determining that the snoop filter has an available snoop filter entry among the plurality of snoop filter entries;

storing the second memory address in the available snoop filter entry; and storing the second victimization priority value in the available snoop filter entry.

20. The method of claim 19, wherein determining the second victimization priority value based on the second transaction request comprises:

determining that the second memory address is stored in a victim history buffer (VHB) entry of a plurality of VHB entries of a VHB of the HN-F circuit;

responsive to determining that the second memory address is stored in a VHB entry of the plurality of VHB entries:

determining the second victimization priority value as corresponding to a VHB-hit victimization priority level that is lower than a corresponding VHB-miss victimization priority level; and deallocating the VHB entry.

21. The method of claim 19, wherein determining the second victimization priority value based on the second transaction request comprises:

determining that a copy of a cache line corresponding to the second memory address is stored in more than one (1) RN-F circuit of the plurality of RN-F circuits; and determining the second victimization priority value as corresponding to a More than One Copy victimization priority level that is a lowest victimization priority level.

22. The method of claim 19, wherein determining the second victimization priority value based on the second transaction request comprises:

determining that the second memory address corresponds to a cache line moved from a Level 3 (L3) cache to a Level 2 (L2) cache; and determining the second victimization priority value as corresponding to an L2 victimization priority level that is lower than an L3 victimization priority level.

23. The method of claim 16, further comprising:

receiving, from a third RN-F circuit of the plurality of RN-F circuits communicatively coupled to the HN-F circuit, a third transaction request comprising a third memory address;

determining a third victimization priority value based on the third transaction request;

determining that a snoop filter entry among the plurality of snoop filter entries stores the third memory address; and updating the snoop filter entry that stores the third memory address with the third victimization priority value.

24. The method of claim 23, wherein determining the third victimization priority value based on the third transaction request comprises:
   determining that the third memory address is stored in a Level 2 (L2) cache and a request type of the third transaction request is one of AllocatingRead and MakeUnique; and
   determining the third victimization priority value as corresponding to a lowest L2 victimization priority level.

25. The method of claim 23, wherein determining the third victimization priority value based on the third transaction request comprises:
   determining that the third transaction request is a Level 3 (L3) stash request having a request type of one of WriteEvictFull, WriteEvictorEvict, WriteBackFull, and Atomic; and
   determining the third victimization priority value as corresponding to a lowest L3 victimization priority level.

26. The method of claim 23, wherein determining the third victimization priority value based on the third transaction request comprises:
   determining that the third memory address is stored in a Level 3 (L3) cache and the third transaction request is an L3 Copy Invalidate by snooping having a request type of one of AllocatingRead, MakeUnique, and CleanUnique; and
   determining the third victimization priority value as corresponding to a lowest Level 2 (L2) victimization priority level.

27. The method of claim 23, wherein determining the third victimization priority value based on the third transaction request comprises:
   determining that that a copy of a cache line corresponding to the third memory address is stored in more than one (1) RN-F circuit of the plurality of RN-F circuits; and
   determining the third victimization priority value as corresponding to a More than One Copy victimization priority level that is a lowest victimization priority level.

28. The method of claim 23, wherein determining the third victimization priority value based on the third transaction request comprises:
   determining that the third memory address corresponds to a cache line moved from a Level 3 (L3) cache to a Level 2 (L2) cache; and
   determining the third victimization priority value as corresponding to an L2 victimization priority level that is lower than an L3 victimization priority level.

29. The method of claim 23, further comprising updating a victimization priority value of a fourth snoop filter entry among the plurality of snoop filter entries to apply an aging modification to the victimization priority value.

30. A non-transitory computer-readable medium having stored thereon computer-executable instructions which, when executed by a processor device, cause the processor device to:
   receive, from a Fully Coherent Request Node (RN-F) circuit of a plurality of RN-F circuits, a transaction request comprising a memory address;
   determine a victimization priority value based on the transaction request;
   determine that no snoop filter entry among a plurality of snoop filter entries of a snoop filter stores the memory address;
   determine that the snoop filter has no snoop filter entries available for allocation;
   select a target snoop filter entry that stores a highest victimization priority value among the plurality of snoop filter entries;
   store the memory address in the target snoop filter entry; and
   store the victimization priority value in the target snoop filter entry.

* * * * *